US008799918B2

(12) United States Patent
Sen

(10) Patent No.: US 8,799,918 B2
(45) Date of Patent: Aug. 5, 2014

(54) DYNAMIC NETWORK LOAD BALANCING USING ROUNDTRIP HEURISTIC

(75) Inventor: Siddhartha Sen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1950 days.

(21) Appl. No.: 11/518,673

(22) Filed: Sep. 11, 2006

(65) Prior Publication Data

US 2008/0066073 A1    Mar. 13, 2008

(51) Int. Cl.
*G06F 9/46* (2006.01)
*G06F 15/173* (2006.01)

(52) U.S. Cl.
USPC ........... 718/105; 718/104; 709/224; 709/225; 709/226

(58) Field of Classification Search
USPC .................................. 709/223, 226; 718/105
See application file for complete search history.

(56) References Cited

U.S. PATENT DOCUMENTS

| 6,006,259 | A  | * | 12/1999 | Adelman et al. | 709/223 |
| 6,026,425 | A  | * | 2/2000  | Suguri et al. | 718/105 |
| 6,032,137 | A  |   | 2/2000  | Ballard | |
| 6,128,642 | A  | * | 10/2000 | Doraswamy et al. | 709/201 |
| 6,351,775 | B1 |   | 2/2002  | Yu | |
| 6,393,458 | B1 | * | 5/2002  | Gigliotti et al. | 709/203 |
| 6,424,621 | B1 | * | 7/2002  | Ramaswamy et al. | 370/230 |
| 6,470,389 | B1 | * | 10/2002 | Chung et al. | 709/227 |
| 6,539,494 | B1 | * | 3/2003  | Abramson et al. | 714/4 |
| 6,560,717 | B1 | * | 5/2003  | Scott et al. | 714/4 |
| 6,748,414 | B1 | * | 6/2004  | Bournas | 718/105 |
| 6,760,314 | B1 |   | 7/2004  | Iwata | |
| 6,801,949 | B1 |   | 10/2004 | Bruck et al. | |
| 6,886,035 | B2 |   | 4/2005  | Wolff | |
| 6,950,848 | B1 | * | 9/2005  | Yousefi'zadeh | 709/203 |
| 6,986,139 | B1 | * | 1/2006  | Kubo | 718/105 |
| 7,251,691 | B2 | * | 7/2007  | Boyd et al. | 709/224 |
| 7,389,510 | B2 | * | 6/2008  | Forrester | 718/105 |

(Continued)

FOREIGN PATENT DOCUMENTS

WO    2006068353 A1    6/2006

OTHER PUBLICATIONS

Arora, Manish; Das, Sajal K.; Biswas, Rupak. "A De-centralized Scheduling and Load Balancing Algorithm for Heterogeneous Grid Environments." Proceedings of the International Conference on Parallel Processing Workshops; Aug. 21, 2002.*

(Continued)

*Primary Examiner* — Abdullah Al Kawsar
(74) *Attorney, Agent, or Firm* — Henry Gabryjelski; Kate Drakos; Micky Minhas

(57) ABSTRACT

Described is a technology by which a relative load of network traffic handling is determined between servers of a cluster, based upon time values that correspond to the time taken by each server to handle a packet. Load may then be transferred between the servers based upon the relative load, for example by having a less-loaded server take some of the responsibility for processing incoming traffic from a more-loaded server. For example, the processing time of a server may be determined by when a receiving server receives a request packet, and when that server sends a return packet. A round trip time for a request and return communication may also be established. A logical tree of nodes representing the servers may be constructed to select pairs of servers for balancing with one another, with the selection algorithm operating recursively, in parallel, and/or repeatedly, until the cluster is balanced.

15 Claims, 8 Drawing Sheets

(56) References Cited

U.S. PATENT DOCUMENTS

| | | | |
|---|---|---|---|
| 7,584,476 B2* | 9/2009 | Chung et al. | 718/104 |
| 7,620,687 B2* | 11/2009 | Chen et al. | 709/205 |
| 7,627,644 B2* | 12/2009 | Slack-Smith | 709/213 |
| 7,712,102 B2* | 5/2010 | Herington et al. | 718/105 |
| 7,752,262 B2* | 7/2010 | Di Giulio et al. | 709/203 |
| 8,296,437 B2* | 10/2012 | Pankratov | 709/227 |
| 2001/0023442 A1* | 9/2001 | Masters | 709/227 |
| 2002/0099970 A1 | 7/2002 | Zhao et al. | |
| 2002/0184376 A1* | 12/2002 | Sternagle | 709/230 |
| 2003/0023669 A1 | 1/2003 | DeLima | |
| 2003/0120802 A1* | 6/2003 | Kohno | 709/237 |
| 2003/0123424 A1 | 7/2003 | Jung | |
| 2003/0158940 A1* | 8/2003 | Leigh | 709/226 |
| 2003/0184799 A1 | 10/2003 | Ferlitsch | |
| 2004/0103194 A1 | 5/2004 | Islam et al. | |
| 2004/0139433 A1 | 7/2004 | Blythe et al. | |
| 2004/0162901 A1 | 8/2004 | Mangipudi et al. | |
| 2005/0102676 A1* | 5/2005 | Forrester | 718/105 |
| 2005/0210469 A1* | 9/2005 | Chung et al. | 718/100 |
| 2005/0289388 A1 | 12/2005 | Black-Ziegelbein et al. | |
| 2006/0248195 A1* | 11/2006 | Toumura et al. | 709/226 |
| 2007/0130566 A1* | 6/2007 | van Rietschote et al. | 718/1 |
| 2007/0198710 A1* | 8/2007 | Gopalakrishnan | 709/225 |
| 2007/0245010 A1* | 10/2007 | Arn et al. | 709/223 |
| 2008/0250110 A1* | 10/2008 | Zhao | 709/206 |

OTHER PUBLICATIONS

Baccala, Brent (Ed.). "Ping" in "Connected: An Internet Encyclopedia," http://www.freesoft.org/CIE/ (online); Apr. 1997. Accessed Aug. 25, 2010.*

Claffy, Kimberly C.; Polyzos, George C.; Braun, Hans-Werner. "Measurement Considerations for Assessing Unidirectional Latencies." Journal of Internetworking (vol. 4, No. 3); Sep. 1993.*

Liao, Ching-Jung; Chung, Yeh-Ching. "Tree-Based Parallel Load-Balancing Methods for Solution-Adaptive Finite Element Graphs on Distributed Memory Multicomputers." IEEE Transactions on Parallel and Distributed Systems (vol. 10, No. 4); Apr. 1999.*

Microsoft Corporation. "How Network Load Balancing Technology Works," Technet (online); Mar. 28, 2003. Accessed Aug. 24, 2010.*

Microsoft Corporation. "Network Load Balancing," Windows 2000 Hosting Deployment; 2000.*

International Search Report, PCT/US2007/076943, Dated: Jan. 21, 2008, pp. 1-10.

Das, et al., "Grido—An Architecture for a Grid-based Overlay Network", http://www.cs.ucla.edu/~alok/papers/grido.pdf.

Lan, et al., "Dynamic Load Balancing of SAMR Applications on Distributed Systems_y", Date: Nov. 2001, http://www.sc2001.org/papers/pap.pap250.pdf.

Oliver Masutti, "Distributed Web Session Management",Date: Oct. 4, 2000, http://www.ifi.unizh.ch/ifiadmin/staff/rofrei/DA/DA_Arbeiten_2000/Masutti_Oliver.pdf.

* cited by examiner to FIG. 6B

DYNAMIC NETWORK LOAD BALANCING USING ROUNDTRIP HEURISTIC

BACKGROUND

In an enterprise having computer network servers that act as web servers or provide web services and/or web applications and so forth, multiple "target" servers are often arranged in a cluster so that the load from incoming requests and the like can be distributed among multiple machines. One network load balancing solution provides a single-tier, front-end server model, but this is relatively expensive, requiring the enterprise to purchase a high-end server or hardware load balancer to operate in front of the cluster.

Network load balancing solutions that move away from the single-tier, front-end server model typically do so by distributing the load balancing problem across the cluster of target servers themselves. This model is cheaper than the front-end server model, and it can generally be deployed using commodity switches and special software sitting on each target server. This typical distributed software-based solution has its own drawbacks, however, such as the lack of a single point for aggregating dynamic data about the cluster. The inability to gather and analyze such data makes it difficult for the cluster to dynamically adjust the distribution of load. For example, a server may become overloaded due to other applications it is hosting, or it may be underutilized if it only recently joined the cluster. In either event, a transfer of load to or from this server may be warranted, however there is no simple or standard solution to this problem in a software-based distributed load balancing system.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a relative load is determined between first and second servers of a cluster, based upon time values that correspond to how much time is taken by each server to handle a packet. Load may then be transferred between the first server and second server based upon the relative load, e.g., from the more-loaded server to the less-loaded server. For example, the processing time of a server may be determined by when a server receives (as time stamped by the receiving server) a request packet, and when that server sends a return packet. A round trip time for a request and return communication may also be established, e.g., by having a sending server time stamp a request packet when sent, and having that same server time stamp the return packet when received.

Load may be transferred in any number of ways. For example, servers that each are responsible for processing a respective subset of the incoming requests may rearrange their subsets such that one server takes more of the other's processing responsibility. A logical tree of nodes representing the servers may be constructed to select pairs of servers for balancing with one another, with the selection algorithm operating recursively and possibly in parallel, and repeatedly, until the servers are balanced.

Thus, by measuring a first time for a first server to handle a packet, measuring a second time for a second server to handle another packet, and assigning responsibility for handling incoming network traffic based upon the first and second times, load balancing may be accomplished between the two servers. Assigning the responsibility for handling incoming network traffic may be performed by dividing up the connection space. For example, this may be accomplished by determining a first subset of IP addresses the first server is responsible for handling, and determining a second, other subset of IP addresses the second server is responsible for handling, based upon the first and second times, with one or more values moved between the subsets. Other information such as port information and/or other packet identifiers also may be used to divide up the connection space.

In one example implementation, a load balancing component determines a relative load between two servers of the cluster based on packet handling times taken by those servers, and balances the network traffic load between the servers based on the relative load. The load balancing component may comprise a driver that runs in the network stack, and/or may have an instance that runs in each of the servers. Alternatively, the load balancing component may run in one server, with a load responder component that runs in the other server to respond to requests from the load balancing component.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards Internet traffic requests handled by servers arranged in a cluster, with the loads that are handled by each server dynamically (and typically repeatedly) balanced among the servers. In one example implementation, the servers that are shown are arranged in parallel in the cluster to each handle a subset of the total set of requests. As is understood, the clustered servers communicate with one another in some way, including by sending heartbeats to one another that ensures other servers are operational. The inter-host communication between servers may occur over a different (back-end) network that is different from the network on which (external) Internet traffic is received.

In one example implementation represented herein, the servers are configured as individual machines having one or more processors, with storage in some common data store and/or replicated among storage devices in the servers. However, it can be readily appreciated that a server actually may be built from multiple devices (e.g., more than one machine arranged to look like a single server), or multiple virtual servers may be present on a single machine.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and networking in general.

Figure 1:
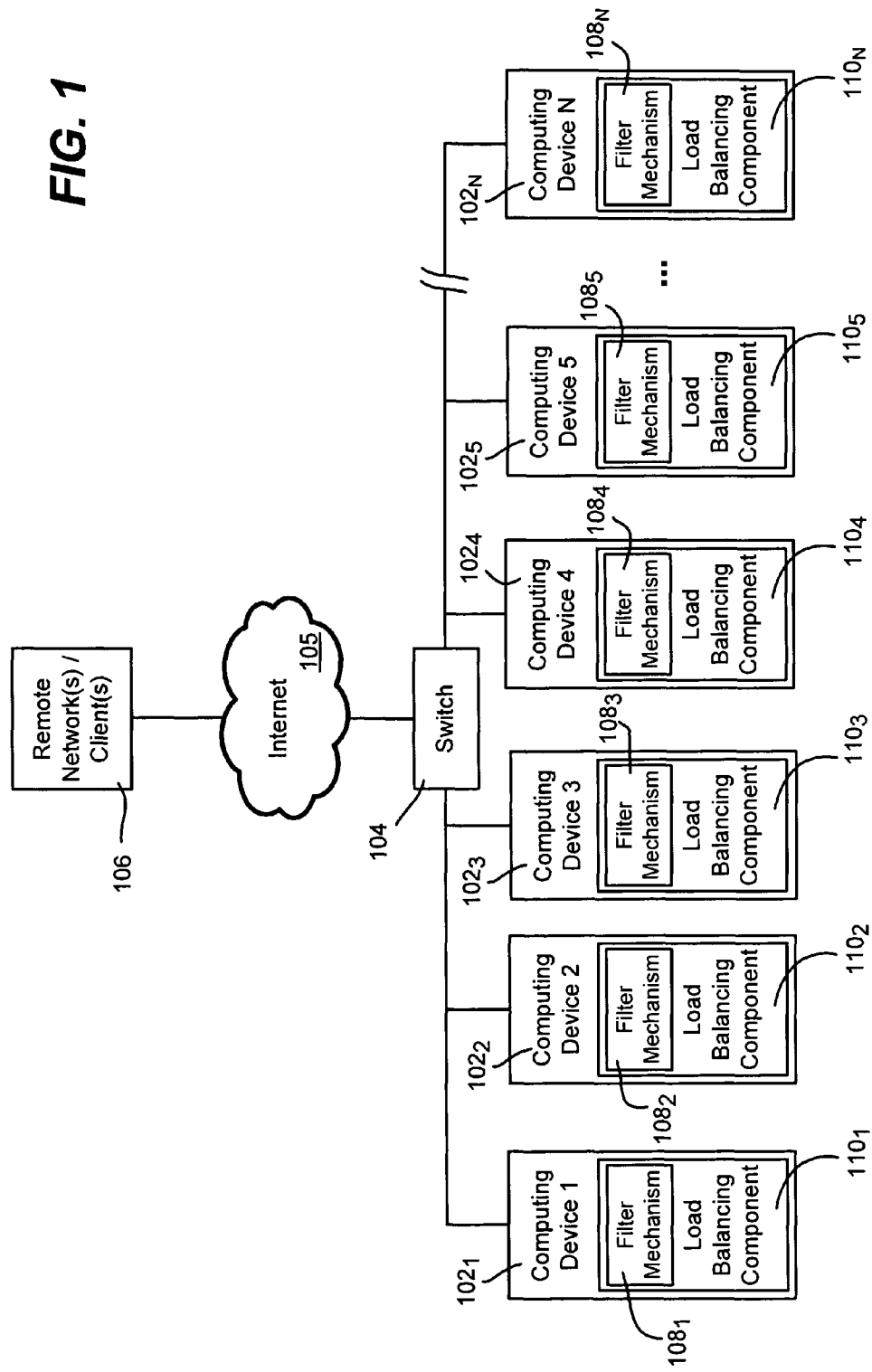
FIG. 1 shows an illustrative example of a general-purpose computing environment including a cluster of servers into which various aspects of the present invention may be incorporated to balance network load.

FIG. 1 shows an example network arrangement for a hypothetical enterprise, in which a number of computing devices $102_1$-$102_n$ are arranged as a cluster and coupled via a switch 104 via the Internet 105 to other remote networks and/or computing devices 106. The computing devices $102_1$-$102_n$ may be any device capable of running code and/or containing logic, but are typically relatively high-powered computing devices configured as servers that are arranged to respond to client requests. Examples of such clustered servers include web content servers, servers that provide access to web services, servers that provide access to web applications, and so forth. Although not shown in FIG. 1, it is understood that various other networking components may be coupled to the cluster, e.g., other (non-cluster) computing devices, routers, other switches, hubs, modems, hardware-based firewalls, and so forth.

Note that while at least six servers $102_1$-$102_n$ are shown within this example of FIG. 1, the technology described herein may apply to as little as two servers. Further, note that the servers may be clustered in other configurations, and any server may be part of a machine that performs one or more other functions, such as to run network and/or cluster administration software. Still further, a given server may be part of more than one cluster, e.g., if a server has three network adapters, it can be part of up to three different clusters.

To handle incoming traffic corresponding to client requests, each of the servers $102_1$-$102_n$ includes or is otherwise associated with a filtering mechanism $108_1$-$108_n$, respectively, that selects only certain of the packets for processing. In one example configuration generally represented in FIG. 2, each filter mechanism $108_1$-$108_n$ comprises a hash function (e.g., $208_1$) that computes a value within a range of values based on the IP/TCP four-tuple 206 within each packet, and associates the computed value with each packet. A selection mechanism (e.g., $209_1$) then determines whether to process the packet based on the computed value associated with that packet. By distributing the set of possible values into different subsets (buckets) handled by each server, that is, by having each server's selection mechanism arranged to only handle packets having associated values that match its own assigned subset of values (and filter out those with other values), the load is distributed across the servers $102_1$-$102_n$ in the cluster.

By way of example, consider server A $102_1$. For each received packet, the server's hash function $208_1$ computes a value from one (1) to sixty (60) based on the IP/TCP four-tuple 206 in the packet header, and associates that value with that packet. For example, a bit within a sixty bit bitmap that is associated with the received packet can be set to represent the value; (note that sixty is an arbitrary choice for the number of possible values, and any practical number is feasible). The selection mechanism $208_1$ may contain its own bitmap $211_1$ with one or more bits set, each corresponding to a value that the server $202_1$ is to handle. A simple logical AND-ing of the packet's associated bitmap with the maintained bitmap $211_1$ will establish whether that packet is to be handled by that server's application or discarded (and instead handled by another server of the cluster). Other mechanisms are feasible, e.g., the hash function may provide a more granular output such as 10,000 values, whereby the selection mechanism may perform some other functionality (such as a table lookup, a range comparison, a second computation and so on) to determine whether to process a given packet.

Returning to the implementation exemplified in FIG. 1, each of the computing devices $102_1$-$102_n$ is shown as including or otherwise being associated with a load balancing component $110_1$-$110_N$, respectively. As described below, in this example implementation, the load balancing components $110_1$-$110_N$ communicate with one another and work with one another to dynamically balance future loads based upon actual current load measurements. Note that in the example implementation represented in FIGS. 1 and 2, the filtering mechanisms $108_1$-$108_N$ are shown as being incorporated into their respective load balancing components $110_1$-$110_N$, however they may be independent components. Further, note that the load balancing described herein is thus predictive in that there is no way to be certain that future loads will match past loads, however performing repeated dynamic balancing operations over time (e.g., at scheduled intervals) tends to balance the load among servers relatively well.

One aspect of the load balancing component is directed towards measuring the actual load on one or more other servers and comparing the load to its own measured load to determine the relative load, or load discrepancy, between the servers. As mentioned above, this may be performed pair-wise between two servers, and thus the example of pair-wise balancing is described herein.

To this end, a pair-wise roundtrip heuristic may be used to captures the relative load between two servers. More particularly, by measuring the end-to-end response time between two instances of the load balancing software, a direct estimate of the amount of load on the server (and an indirect estimate of the amount of congestion on the network) is obtained from the perspective of the load balancing software. Note that although there are many ways of quantifying the load discrepancy between the servers, e.g., CPU load, memory usage, number of packets processed, number of connections, and so forth, there are any number of criteria that can adversely impact these variables and provide an estimate that is not really indicative of actual load. As such, processing of one or more actual packets tends to provide a better estimate of a server's actual load.

Figure 3:
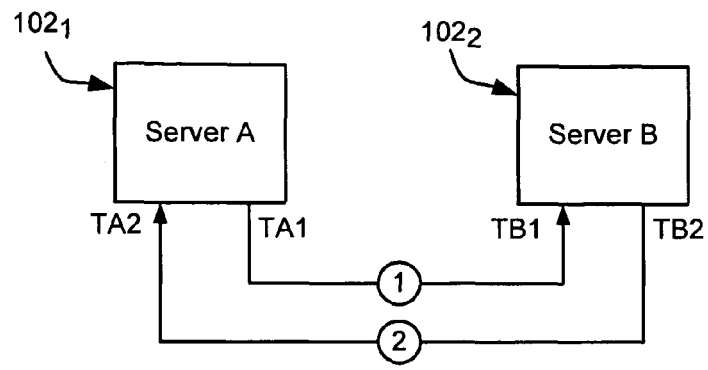
FIG. 3 is a block diagram representing the exchange of a packet set comprising one or more measuring packets communicated to determine relative load between two servers.

By way of example, FIG. 3 shows two servers A (e.g., $102_1$) and B (e.g., $102_2$) that each have network load balancing software (balancer) configured to exchange load balancing-related packets with one another. In one example, the server A $102_1$ sends a measuring request packet to the server B $102_2$ (the arrow labeled with circled numeral one (1)) and measures the round trip time (RTT) of the response packet (the arrow labeled with circled numeral two (2)). To this end, the network load balancer in server A $102_1$ stamps the packet with the time (TA1) it is sent from the server A $102_1$, and stamps the packet with the time (TA2) that the measuring response packet is received from the server B $102_2$. Note that in one example implementation, the request/response packets are essentially the same packet that is modified by the servers.

Returning to the initial measuring packet that was sent from the server A $102_1$ to the server B $102_2$ (the arrow labeled one (1)), upon receiving the packet, the network load balancer in the server B $102_2$ provides a subset of this interval by timing how long it takes to process the packet before it is returned: to the server A $102_1$. More particularly, the network load balancer in the server B $102_2$ stamps the response packet with its received time (TB1), and after processing, stamps the response packet with its send time. Note that TA1 and TA2 are also returned in the response packet, however other mechanisms are feasible, e.g., TA1 and TA2 can be recorded locally by server A and re-associated with the response packet upon its return.

Based on the received response packet, the server A $102_1$ is able to deduce the total round trip time (RTT=TA2−TA1), and the processing time of the server B $102_2$ (P=TB2−TB1, a subset of the round trip time). Of course, it is equivalent to have the server B compute the processing time and place the computed value in the packet. Note that any clock difference between server A's clock and server B's clock are irrelevant, as the round trip time is based solely on server A's clock, and server B's processing time is based solely on server B's clock. The round trip time minus server B's processing time is an effective estimate for the traffic/congestion on the local network, while server B's processing time is an effective estimate for the load on server B. It should be noted that multiple packets may be exchanged to obtain this information, e.g., to obtain an average, to discard anomalies, and so forth.

Based on the round trip time, the server A $102_1$ can perform various actions, including actions not necessarily directed towards load balancing. For example, clustered servers communicate heartbeats with one another for various reasons, including to ensure that other servers in the cluster are still operating and communicating, and the server A can use the round-trip time to decide if the rate of heartbeat transmission needs to be increased (e.g., if the local network appears congested) or decreased (e.g., if the rate of heartbeats is relatively fast do to previous congestion but now the congestion appears gone).

With the processing measurement P, the server A $102_1$ has an effective estimate of the server B's load. In order to determine the load discrepancy, the server A $102_1$ also needs an estimate of its own load. This can be done by having the server A send a measuring packet to itself, or by having the server B send a measuring packet to the server A whereby the server A will know its own processing time; if the server A also wants the round trip time (measured from the server B to the server A and back from A to B), the server B can provide this with a further transmission to the server A.

Figure 4:
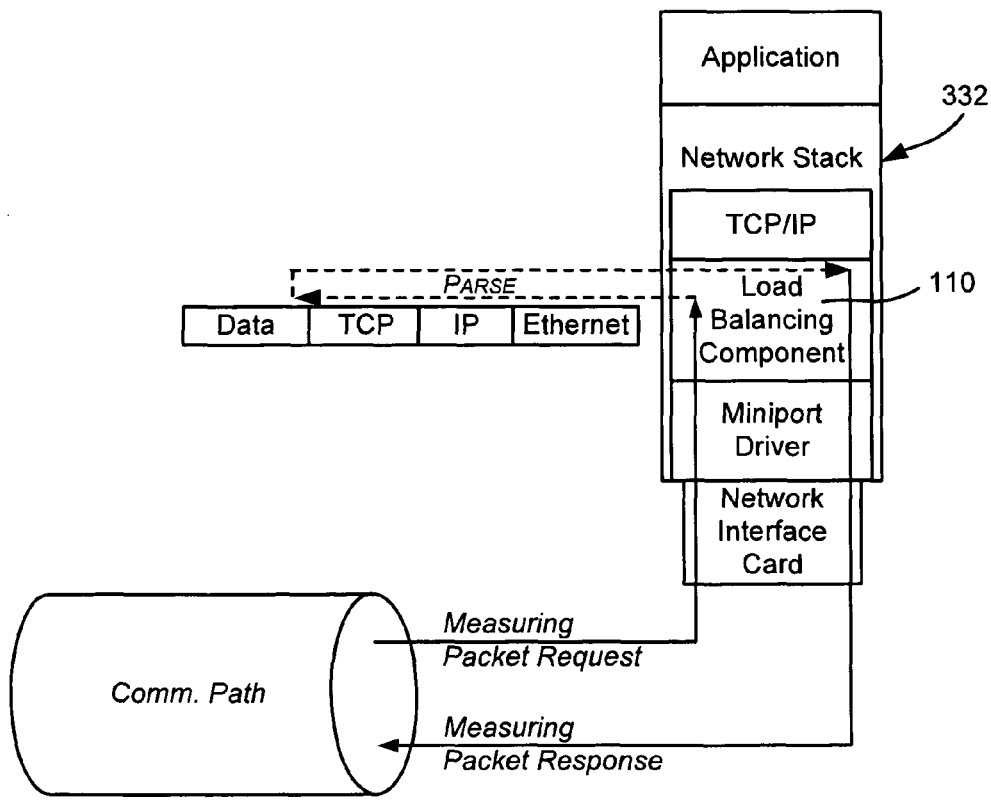
FIG. 4 is a representation of a network stack including a load balancing component.

In one example implementation, the packet sent between the servers A and B is one that exercises the longest packet-processing path in the load balancing code. This is represented in FIG. 4, where, for example, the network load balancer 330 is configured as a driver in the network stack 332, and the received packet header is parsed until the TCP/IP header by having the network load balancer's data arranged at an appropriate location within the packet header. Note that the packet spends time in the sending machine and the receiving machine (e.g., in each machine's NDIS (Network Driver Interface Specification), in the NIC (Network Interface Card), and so forth) before reaching the network media; this can be compensated for, or considered part of the measured time.

Once the server A knows server B's processing time and its own processing time, the relative load between the servers is known to the server A (and to the server B if communicated thereto). Note that the relative load based solely on server A's and server B's processing times may be adjusted based on other factors, including the measured round-trip time, compensation for time in other components, CPU usage, memory usage, and so forth, however in any event, a relative load is measured. As used herein, the term "handling time" refers to the time used to estimate the relative load, based at least on actual time measurements obtained via packet communication, but possibly modified by one or more other such criteria.

Once the relative load has been measured between two servers, it may be desirable to transfer load from one server to the other if, for example, a load discrepancy is detected. Note that the discrepancy may have to achieve some threshold, e.g., relatively small discrepancies may be considered equal loads with no balancing action needed.

To adjust any discrepancy between the two servers, a certain amount of load quanta (one or more units) may be moved from one server to the other, less-loaded server. The mechanism by which this occurs is specific to the particular implementation of the load balancing system. Typically, this mechanism is already available and in fact used by clusters, for example, to redistribute load when a server leaves the cluster (for example, if the server inadvertently crashes or is taken off purposefully, such as for maintenance), or when a new server comes online and joins the cluster.

In general, the load discrepancy between two servers is adjusted by transferring load from the busier machine to the less busy machine. One load quantum, or unit for measuring load, is the number of connections on the servers. However, while feasible to transfer live connections (and thereby change current load), this is difficult to do, requiring significant overhead, and may not affect future load. Alternatively, in an implementation that uses the above-described or similar filtering mechanism, a suitable mechanism for transferring load is to transfer one or more hash-generated, packet-associated values (that is, the buckets corresponding to slices of the connection space that each server is responsible for handling a subset of) from the more-loaded server to the less-loaded server.

Note that as mentioned above, past traffic is not an indicator for future traffic, and thus there is no way to predict what the effect of transferring a single bucket will do to the relative load of servers A and B, and also how this effect changes from bucket to bucket. Some approximations may be made with regards to the amount of load represented by a single bucket (e.g., in numbers of connections), and the granularity of measurement that is desired (how many buckets to use). The arrival rate of connections and their effects on load balancing may be measured and used to determine a reasonable configuration for a given cluster.

Figure 2:
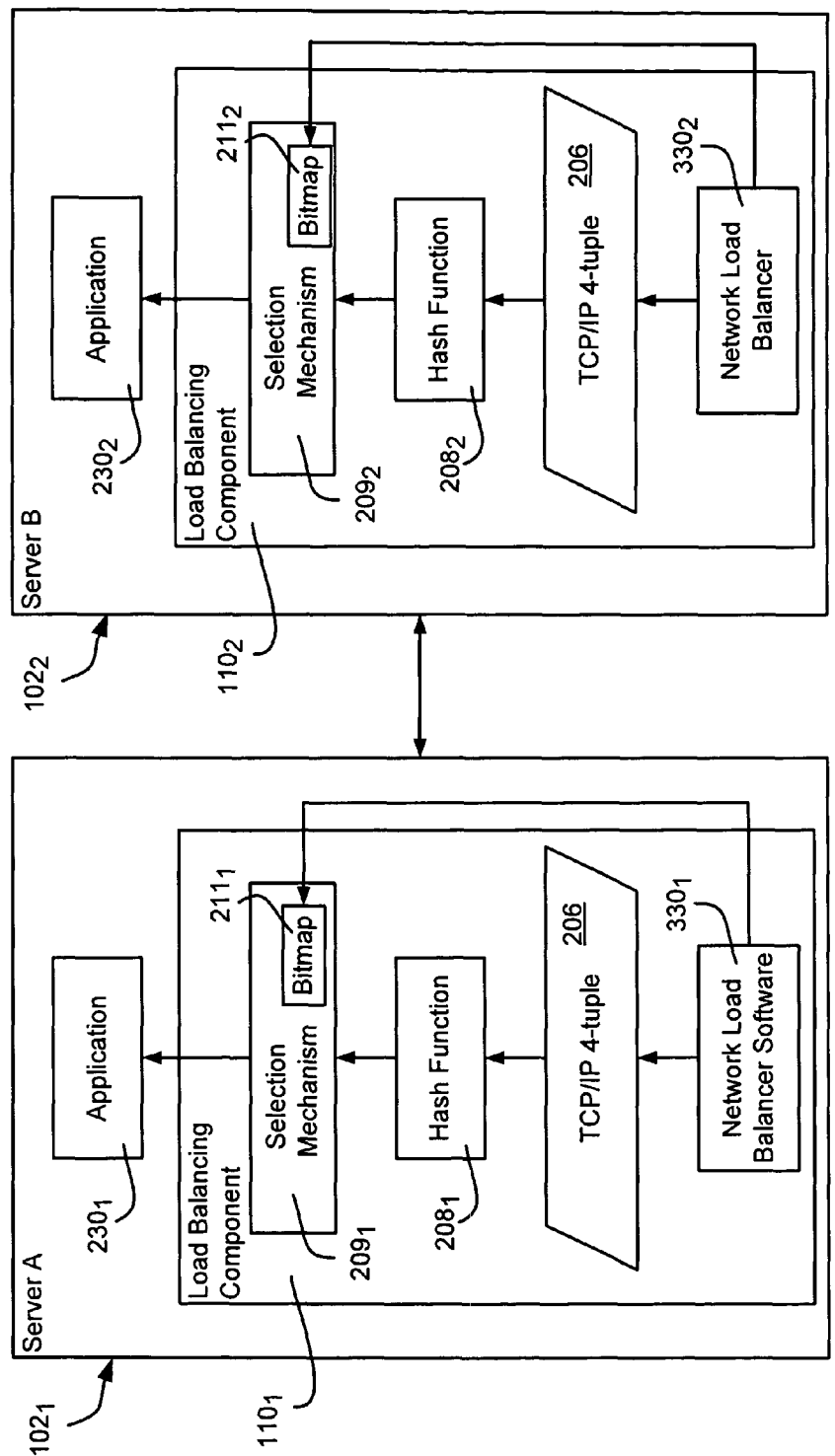
FIG. 2 is a block diagram representing example components within servers of a cluster.

Returning to the example of FIG. 2, one way this may be accomplished with the filtering mechanism is to have the network load balancer of each server agree to alter the subset of values that each handles. For example, the network load balancer $330_1$ of server A and $330_2$ of server B can change their respective maintained bitmaps $211_1$ and $211_2$ (such as exchanged in the heartbeat communications) so that A will select more of the packets and B will select less such that B has less load, (or vice-versa if B is more loaded). In this example, the load quanta corresponds to one or more packet-associated hash values that each server is responsible for handling. The number of values that server A takes from server B can vary according to the load discrepancy (and/or other configuration parameters as described above), or as little as a single value can be transferred per measurement/transfer operation. Note that the process may be repeated until the cluster has a fair and efficient distribution of load. Alternative ways to accomplish a change in load distribution includes altering the hash function in each server based on measured load, or providing a secondary function below each hash function that modifies the hash function's packet-associated value to move more packets to one server instead of another.

Figure 5:
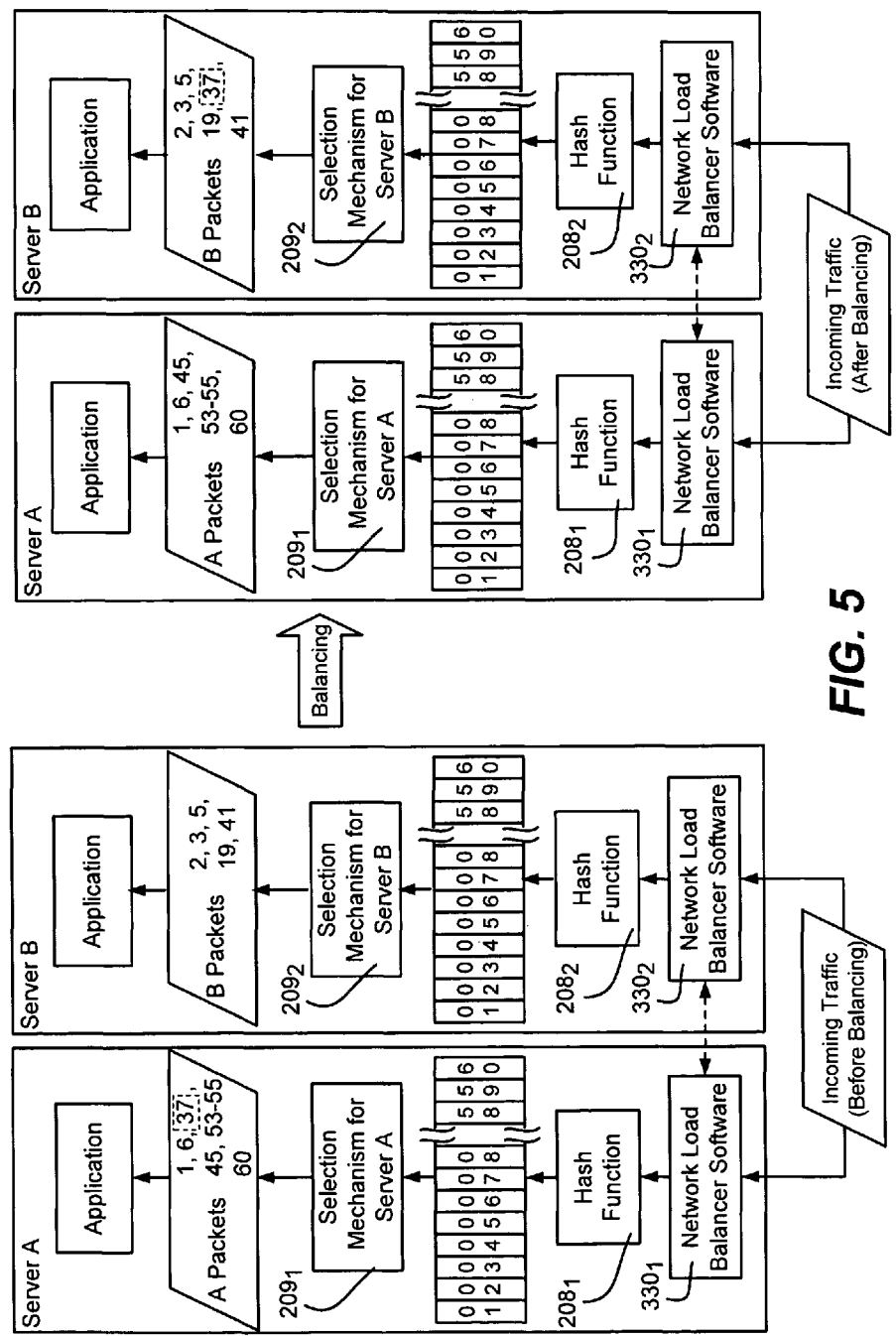
FIG. 5 is a representation of one example way in which load may be balanced between two servers.

FIG. 5 is a representation of load balancing, in which before balancing, the hash functions $208_1$ and $208_2$ output values between one (1) and sixty (60), and the selection mechanism $209_1$ for server A is handling packets having associated hash-generated values 1, 6, 37, 45, 53-55 and 60, while the selection mechanism $209_2$ for server B is handling packets having associated hash-generated values 2, 3, 5, 19 and 41. Packets with other associated values are handled by other servers of the cluster (not shown in FIG. 5).

As represented on the right side of FIG. 5, after balancing, the selection mechanism $209_1$ for server A is handling packets having associated hash-generated values 1, 6, 45, 53-55 and 60, while the selection mechanism $209_2$ for server B is handling packets having associated hash-generated values 2, 3, 5, 19, 37 and 41. As can be readily appreciated, after balancing, packets associated with hash-generated values of 37 in this example are no longer handled by server A, but instead by server B, transferring some of the load from server A to server B.

As can be readily appreciated, pair-wise balancing may occur as many times between two servers as desired to bring the loads into some reasonable balance between those two servers, however there are often more than two servers in a cluster. To this end, various mechanisms are feasible for having each server perform a pair-wise load balancing operation with each other server, including mechanisms based on randomized load balancing algorithms such as RLB (Randomized Load-Balancing) or SRLBA (Sequential Randomized Load-Balancing with Adversary).

Figure 6A:
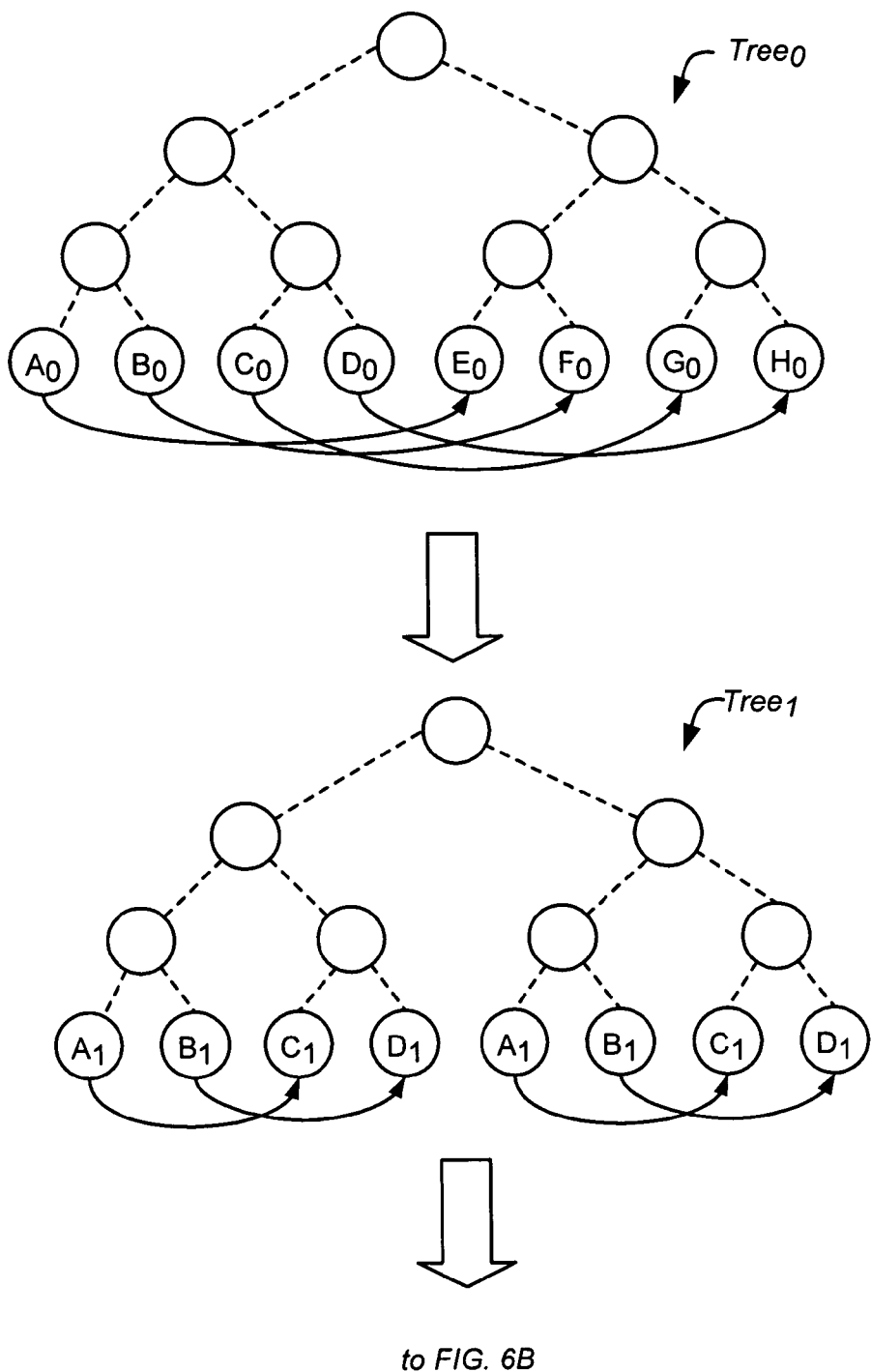
FIGS. 6A and 6B comprise representations of nodes that perform pair-wise balancing with one another in a number of rounds, including possibly parallel operations within each round, to balance a cluster.
Figure 6B:
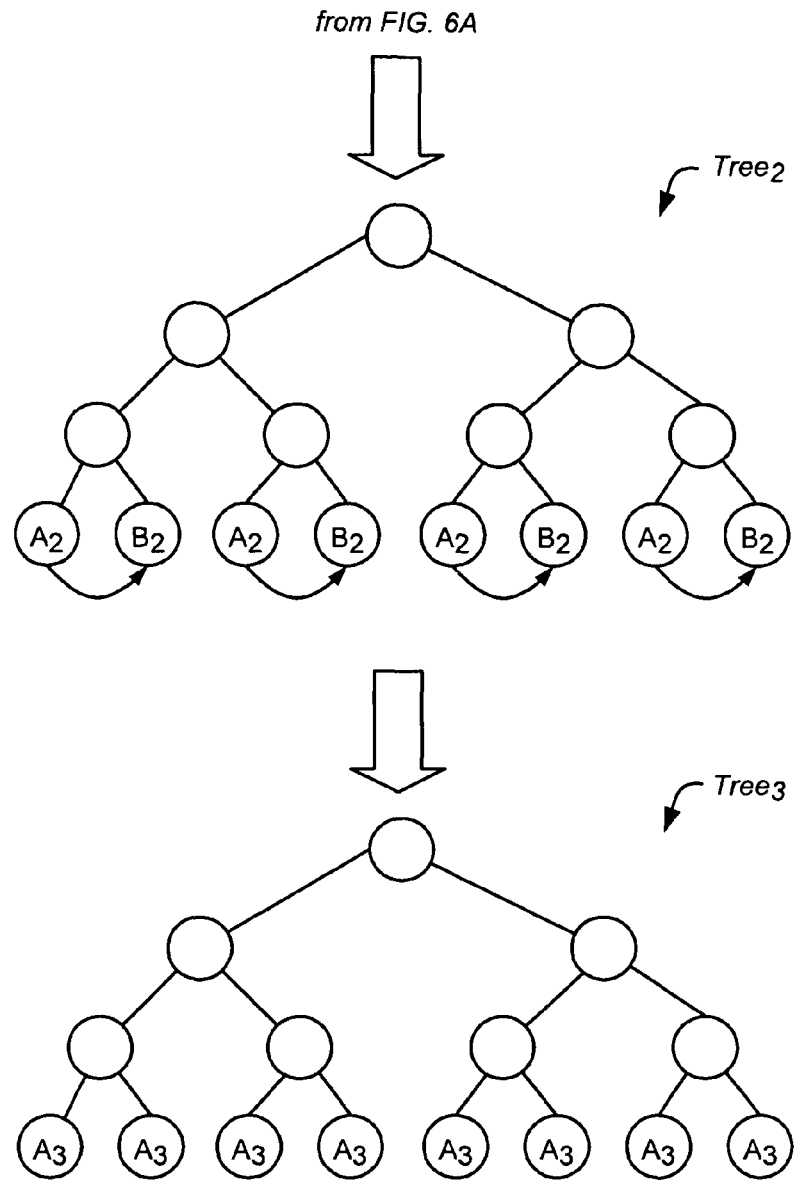

An alternative for balancing multiple servers is represented in FIGS. 6A and 6B, in which a tree-based, recursive algorithm is used. As will be understood, the tree-based, recursive algorithm requires O(N log N) load balancing steps, where N is the number of servers in the cluster and a load balancing step comprises measuring and adjusting the load discrepancy between two servers. However, as represented in FIGS. 6A and 6B, the algorithm is highly parallelizable, and can complete after O(log N) parallelized steps, where a parallelized step comprises the maximum number of load balancing steps that can be performed simultaneously.

In the example of FIGS. 6A and 6B, given some example number of servers (eight, labeled A-H), the parallel load balancing algorithm guarantees that after O(N log N) sequential steps (which can be parallelized into O(log N) steps), the servers have an equal share of load. The algorithm balances the load quickly and exposes a high degree of parallelism, such that many steps can be performed at the same time.

To this end, as represented in FIG. 6A, an imaginary tree of nodes, $Tree_0$, is created above the nodes representing the servers A-H, as represented by the dashed lines showing the tree.

The servers on the left and right "halves" of the tree are balanced, as represented by the tree labeled $Tree_1$. Note that server A balanced with server E, server B balanced with server F and so on, whereby server A changed from load state $A_0$ to load state $A_1$ and server $E_0$ to load state $E_1$, which because of the balancing is the same as load state $A_1$ and is thus labeled as $A_1$ in $Tree_1$. Note that the balancing operations between any pair of servers can occur simultaneously with the balancing operations of any other pair or pairs of servers.

As seen by continuing to FIG. 6B, balancing is performed recursively, until only A and B load states ($A_2$ and $B_2$) exist in $Tree_2$, and thereafter only one A load state ($A_3$) exists in $Tree_3$. There is no need for further recursion because the servers are in balance, however as described above, balancing can continue to be performed (e.g., by starting over) because loads change over time.

The number of load balancing steps required by parallel load balancing algorithm for an N-server cluster can be described by the following recurrence (assume for simplicity that N is a multiple of 2):

$$T_N = N/2 + 2T_{N/2}$$

which yields a sequential running time of O(N log N). By parallelizing as many steps as possible, the recurrence becomes:

$$T_N = 1 + T_{N/2}$$

which yields a parallel running time of O(log N). The '1' in this recurrence accounts for the first round of load balancing steps between the two halves of the original tree, which can be done in parallel because they occur between non-overlapping pairs of servers.

As can be readily appreciated, not all clusters have servers that correspond to a power of two, however the algorithm still works by performing the pair-wise balancing steps as if the cluster was a power of two. For example, in the initial round, some nodes on the left half of the tree may not be able to balance because there is not a counterpart in the right half of the tree. However, the unpaired nodes will be balanced in the next round (or rounds), because the left side of the initial tree is a power of two. At this point, the algorithm can be re-run to smooth out any imbalances in load, possibly with different sets of servers in the left and right halves. Note that the frequency of running the algorithm can be decided by the implementer, e.g., generally as a tradeoff between the time/resources/bandwidth used by the algorithm versus how much the load distribution is allowed to vary.

To summarize, in the power-of-two scenario, the nodes substantially have the same load after a single run of the algorithm. In a non-power-of-two scenario, the algorithm may be run multiple times to smooth out the imbalances. It is also feasible to use heuristics or estimates such as weights and/or ratios based on how many servers are missing in the right half of the tree to better predict the target load of the nodes in the right half of the tree.

Figure 7:
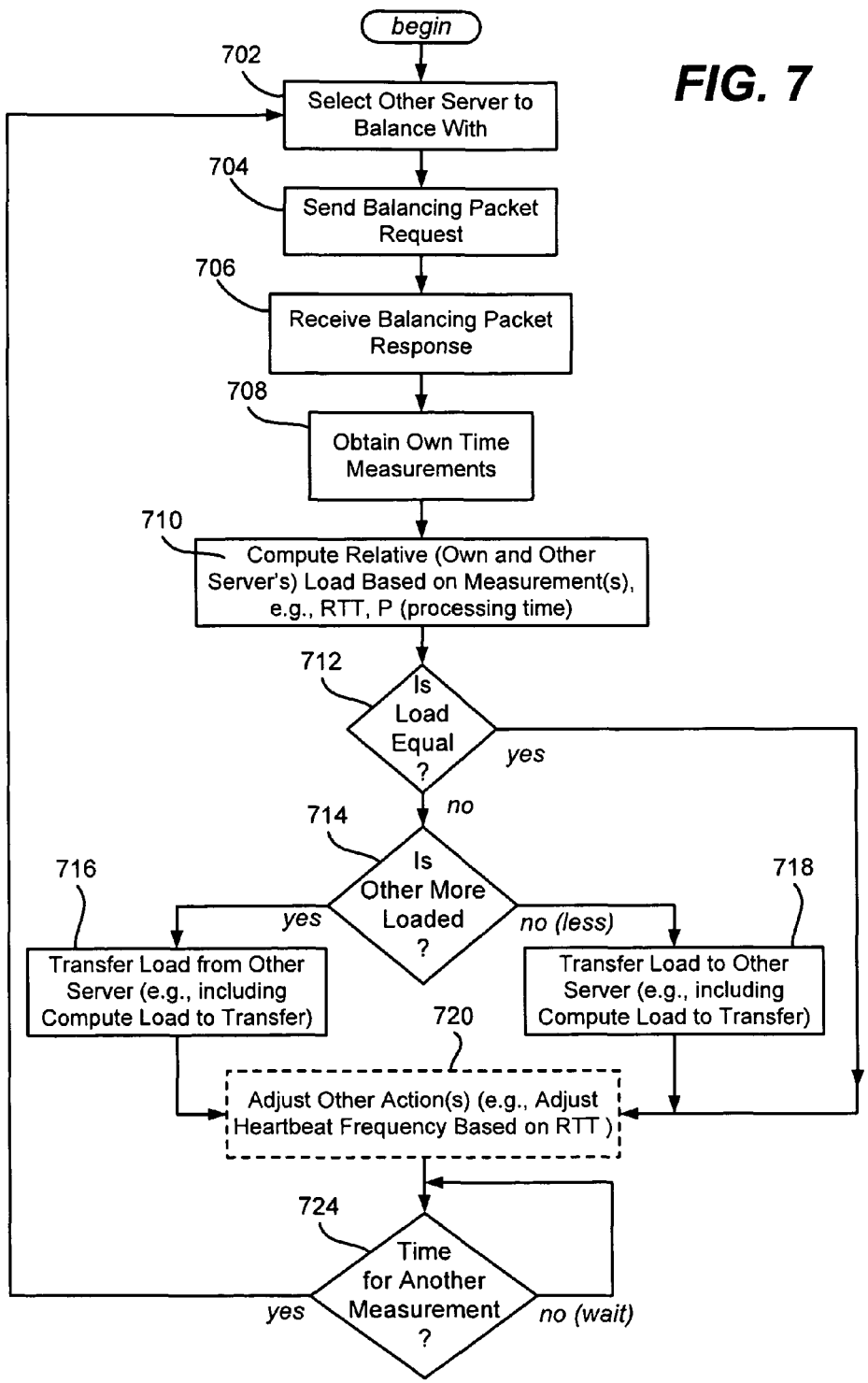
FIG. 7 is a flow diagram showing example steps that may be taken by servers to balance network load with one another.

FIG. 7 is a flow diagram showing an example of how balancing may occur, beginning at step 702 in which an initiating server selects another server for balancing therewith. As set forth above, selection may be accomplished by one of a number of various algorithms, including by setting up a tree of nodes for parallel pair-wise balancing as described above with reference to FIGS. 6A and 6B.

Step 704 represents sending the balancing request packet from an initiating server, e.g., the one which selected the other or by agreement of the two. As described above, the balancing request packet may be stamped with the sending time. Step 706 represents receiving the response, which, as also described above, may comprise the request packet as modified by the other server, e.g., stamped with the other server's time stamps upon receipt by the other server and upon sending by the other server. The response packet also may be stamped by the time it is received back at the initiating server, whereby the round-trip time and the other server's processing times are now known to the initiating server.

Step 708 represents the initiating server obtaining its own time measurements, which as described above may be accomplished by sending a measuring packet to itself, or by having the other server send a measuring packet to the initiating server. In any event, at this time the relative load may be computed, as represented by step 710.

Step 712 represents determining whether the loads are equal, at least within a certain threshold. For example, if the relative load is computed as a ratio of B's processing time over A's processing time ($P_B/P_A$), then a relative load of one ($P_B/P_A=1$) means no balancing is required (which may be plus-or-minus some value corresponding to a state in which balancing is not worthwhile). Another mathematical computation may be used, e.g., a difference of zero ($P_B-P_A=0$) can indicate equal load, again possibly plus-or-minus some value.

If equal within an acceptable range, step 712 branches ahead to optional step 720, where, for example, other actions may be performed. An example of one such action is to adjust the heartbeat frequency based upon the measured round trip time minus the processing time on the other node.

Otherwise, step 714 is executed, which branches to step 716 if the other server is more loaded to take some of the load from that other server, or to step 718 if the other server is less loaded to give some of the load to that other server. Step 720 may then be executed, although as can be readily appreciated, step 720 may be executed before load balancing rather than after.

Step 724 repeats the process by branching back to step 702. This may be after an interval, may be substantially continuous, or upon some triggering event.

Figure 8:
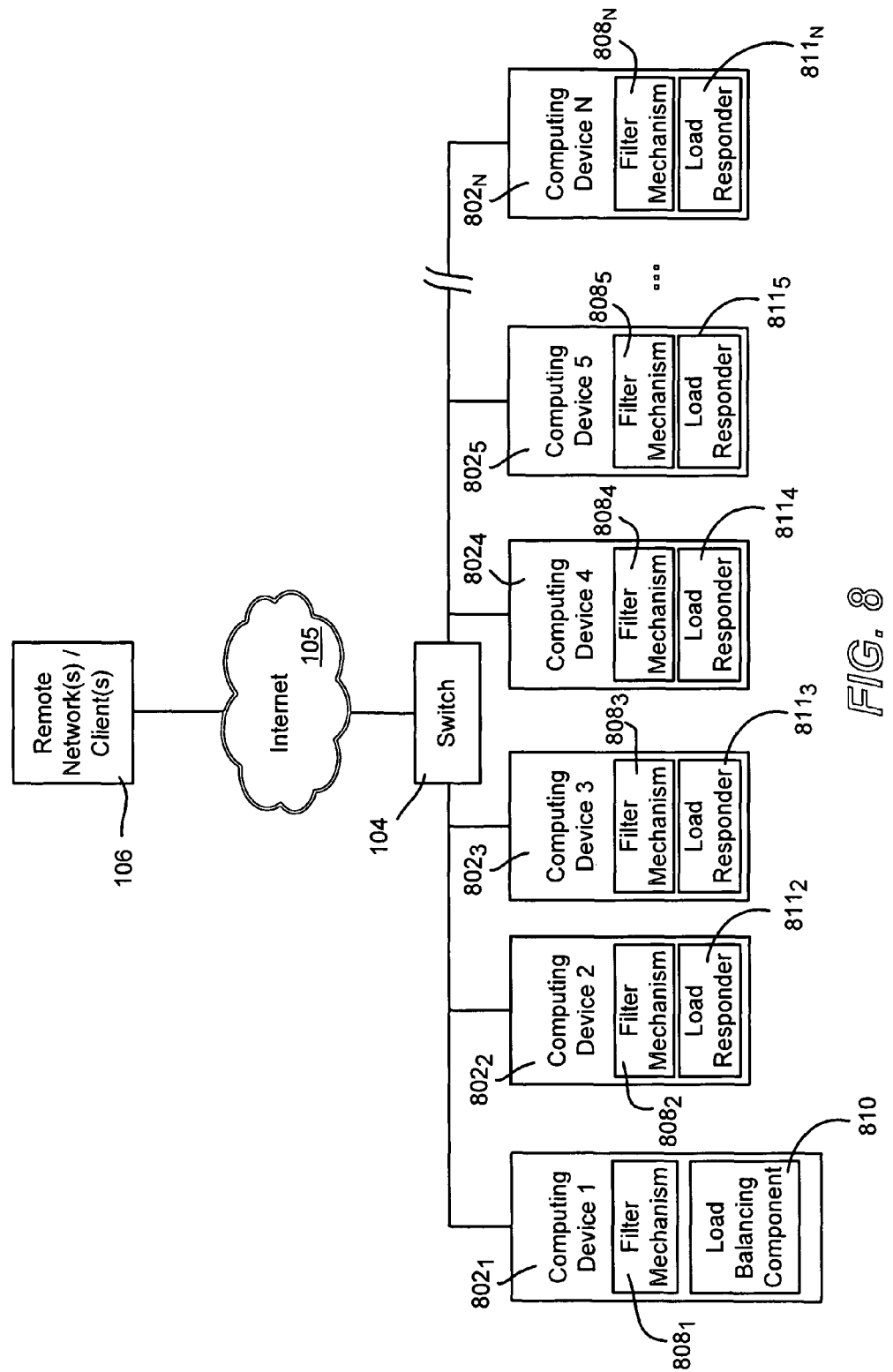
FIG. 8 shows an illustrative example of a cluster of servers into which various alternative aspects of the present invention may be incorporated to balance network load.

Turning to FIG. 8, an alternative load balancing mechanism is represented. In FIG. 8, one computing device (e.g., 802$_1$) includes the load balancing mechanism 810, and essentially acts as a leader, or main node. The other computing devices (e.g., 802$_2$-802$_N$) respond to load balancing measurement requests, such as by handling packets as described above, via load responders (e.g., 811$_2$-811$_N$).

As can be readily appreciated, with the relative load measurements, the load balancing component 810 can adjust the loads by modifying the filtering mechanisms 808$_1$-808$_N$ in the other computing devices 802$_2$-802$_N$, respectively, as well as adjust its own filtering mechanism 808$_1$. The balancing can be performed pair-wise, or by having the main node's load balancing mechanism 810 collect multiple relative loads for simultaneous balancing. Note that there can be more than one main node, e.g., each balances a different subset of other nodes, with the main nodes communicating with one another to keep the different subsets within an acceptable balance.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method, comprising:
    using a processor of a first server of a cluster, selecting a second server for load balancing with the first server using a tree-based, recursive algorithm;
    determining a relative load between the first server and the second server of the cluster based upon a first time value that corresponds to a quantity of time taken by the first server to handle a packet set comprising at least one packet measured as a difference between a timestamp associated with a response to the packet set sent by the first server and a timestamp associated with receipt of the packet set by the first server, the packet set exercising a longest packet-processing path in the first server, and a second time value corresponding to a quantity of time taken by the second server to handle a packet set comprising at least one packet measured as a difference between a timestamp associated with a response to the packet set sent by the second server and a timestamp associated with receipt of the packet set by the second server, wherein each of the first server and the second server comprises a packet handing selection mechanism and each of the packet handling selection mechanism includes a plurality of values in which each value is used to determine whether to handle an incoming request based on a hash of an IP (Internet Protocol) address associated with that incoming request; and
    transferring, by the first server, at least some load from the first server to the second server based upon the relative load by altering values of the packet handling selection mechanism of the first server and the second server.

2. The method of claim 1 wherein determining the relative load comprises sending the packet set from the first server to the second server, and for each packet sent to the second server, determining a round trip time for a return packet received back from the second server.

3. The method of claim 1 wherein transferring at least some load between the first server and second server comprises moving at least one value corresponding to one or more connections between the first and the second server.

4. The method of claim 1 wherein third and fourth servers of the cluster perform load balancing by similarly determining another relative load between the third and fourth servers and transferring at least some load between the third and fourth servers based on the other relative load, and having further computer-executable instructions comprising, after transferring at least some load between the first server and second server, and after transferring at least some load between the third server and fourth server, determining a new relative load between the first and third servers of the cluster, and transferring at least some load between the first server and the third server based on the new relative load.

5. The method of claim 4 having further computer-executable instructions comprising constructing a logical tree of nodes representing the servers to establish which server is the first server, which server is the second server, which server is the third server, and which server is the fourth server.

6. In a cluster of servers, a method comprising:
    selecting by a first server of the cluster, a second server of the cluster for load balancing with the first server using a tree-based, recursive algorithm;
    measuring, by a first server, a first time for the first server to handle a packet set comprising at least one packet, the first time measured as a difference between a timestamp associated with a response to the packet set sent by the first server and a timestamp associated with receipt of the packet set by the first server;
    determining, by the first server, a second time for a second server to handle another packet set comprising at least one packet, the second time determined as a difference between a timestamp associated with a response to the packet set sent by the second server and a timestamp associated with receipt of the packet set by the second server, wherein each of the first server and the second server comprises a packet handing selection mechanism and each of the packet handling selection mechanism includes a plurality of values in which each value is used to determine whether to handle an incoming request based on a hash of an IP (Internet Protocol) address associated with that incoming request; and
    assigning responsibility for handling incoming network traffic to the first server and the second server, by the first server, based upon the first and second times by altering values of the packet handling selection mechanism of the first server and the second server.

7. The method of claim 6 wherein measuring the second time comprises sending a request packet from the first server to the second server.

8. The method of claim 6 wherein measuring the first time comprises sending a packet from the first server to the first server to determine a first processing time.

9. The method of claim 6 wherein assigning responsibility for handling incoming network traffic comprises determining a first subset of at least one value corresponding to connections that the first server is responsible for handling, and determining a second, other subset of at least one other value corresponding to other connections that the second server is responsible for handling, based upon the first and second times.

10. In a cluster of servers that share handling of network traffic load, a computing device comprising:
   a first server comprising a processor coupled to a memory, the memory storing a load balancing component that:
      selects a second server for load balancing with the first server using a tree-based, recursive algorithm;
      measures a packet handling time of the first server as a difference between a timestamp associated with a response to a packet set sent by the first server and a timestamp associated with receipt of the packet set by the first server and determines a packet handling time of the second server as a difference between a timestamp associated with a response to the packet set sent by the second server and a timestamp associated with receipt of the packet set by the second server;
      determines a relative load between the first server and a second server of the cluster based on the packet handling times taken by those servers, wherein each of the first server and the second server comprises a packet handing selection mechanism and each of the packet handling selection mechanism includes a plurality of values in which each value is used to determine whether to handle an incoming request based on a hash of an IP (Internet Protocol) address associated with that incoming request; and
   the first server load balances the network traffic load between the servers based on the relative load by altering values of the packet handling selection mechanism of the first server and the second server.

11. The computing device of claim 10 wherein the load balancing component includes an instance that runs in each of the servers.

12. The computing device of claim 10 wherein the load balancing component comprises a driver that runs in a network stack.

13. The computing device of claim 10 wherein the load balancing component runs in the first server, and further comprising a load responder component that runs in the second server to respond to requests from the load balancing component.

14. The computing device of claim 10 wherein each server is associated with a filter mechanism that determines which network traffic to process, and wherein the load balancing component balances the network traffic load by communicating filtering data to the filtering mechanism.

15. The computing device of claim 10 wherein at least two pairs of servers are balanced substantially in parallel.

* * * * *